United States Patent

Saitou

Patent Number: 5,304,594
Date of Patent: Apr. 19, 1994

[54] RESIN COMPOSITION FOR RESIN-BANDED BEARING

[75] Inventor: Katsuyuki Saitou, Kanagawa, Japan

[73] Assignee: NSK Ltd., Tokyo, Japan

[21] Appl. No.: 124,565

[22] Filed: Sep. 22, 1993

Related U.S. Application Data

[63] Continuation of Ser. No. 845,952, Mar. 4, 1992, abandoned.

[30] Foreign Application Priority Data

Mar. 5, 1991 [JP] Japan .................. 3-038532

[51] Int. Cl.$^5$ .......................... C08J 5/10; C08K 3/04; C08L 31/08
[52] U.S. Cl. .................. 524/495; 524/401; 524/430; 524/442; 524/443; 524/462; 524/463; 524/494; 524/496; 524/493; 524/513; 524/539; 525/444
[58] Field of Search ............... 524/401, 494, 495, 513, 524/539, 493, 430, 462, 463, 442, 443, 496; 525/444

[56] References Cited

U.S. PATENT DOCUMENTS

4,022,748 5/1977 Schlichting et al. ............ 524/411
4,900,610 2/1990 Hochberg et al. ............... 428/195

FOREIGN PATENT DOCUMENTS

0383979 8/1990 European Pat. Off. .
0413560 2/1991 European Pat. Off. .
0443457 8/1991 European Pat. Off. .
3-33221 4/1991 Japan .
3-287662 12/1991 Japan .

Primary Examiner—Paul R. Michl
Assistant Examiner—U. K. Rajguru
Attorney, Agent, or Firm—Sughrue, Mion, Zinn, Macpeak & Seas

[57] ABSTRACT

Disclosed is a resin composition for a resin-banded bearing comprising from 25 to 65% by weight of a thermoplastic polyester elastomer, from 70 to 20% by weight of a thermoplastic polyester resin, and from 5 to 15% by weight of a filler, based on the total amount of the thermoplastic polyester elastomer, the thermoplastic polyester resin and the filler. The resin composition withstands long-term use at high temperatures of 140 or higher to exert creep-proofing performance in a stable manner.

6 Claims, 1 Drawing Sheet

RESIN COMPOSITION FOR RESIN-BANDED BEARING

This is a continuation of application Ser. No. 07/845,952 filed Mar. 4, 1992 now abandoned.

FIELD OF THE INVENTION

This invention relates to a resin composition useful as a resin band of resin-banded bearings, which is formed on the outer circumference of a bearing outer ring or the inner circumference of a bearing inner ring so as to endow the bearing with creep resistance for use in metallic housings or metallic shafts. More particularly, it relates to a thermoplastic polyester elastomer resin composition which has excellent heat resistance and provides a resin band functioning to prevent creep of bearings used in high temperatures.

BACKGROUND OF THE INVENTION

Bearings are generally fitted in a housing or a shaft at room temperature with a certain interference, but in many cases the allowable interference for assuring a good fit and preventing deformation of the bearing is limited. As a result, the interference becomes insufficient under some working temperature conditions due to a difference in coefficient of thermal expansion between the bearing and the housing or the axis, leading to a creep phenomenon (wear due to slippage) of the tracking ring of the bearing.

Various creep-proof bearings having a function of preventing such a creep phenomenon have been proposed to date. For example, JP-A-50-155850 (the term "JP-A" as used herein means an "unexamined published Japanese patent application") discloses a bearing having a function of preventing creep of the inner ring as shown in FIG. 1. In FIG. 1, bearing 2 composed of inner ring 3 and cramp ring 7 is fitted on axis 1. Inner ring 3 has through-hole 4 in which ball 5 is placed, with a part of the top of the ball projecting on through-hole 4 to a height $t_1$. Cramp ring 7 has hole 6 for passing ball 5 through and is eccentric at a distance E from the center $P_1$ of axis 1 so as to form a gap $t_2$ with inner ring 3. In fitting bearing 2 on axis 1, inner ring 3 is positioned, and cramp ring 7 is then fitted thereon in such a manner that hole 6 thereof fits through-hole 4 of the inner ring. Ball 5 is put into through-hole 4 through hole 6, and cramp ring 7 is strongly turned to have ball 5 chock up axis 1. Slippage between the axis and the inner ring is thus prevented for creep-proofing.

Another type of known creep-proof bearings is a resin-banded type shown in FIG. 2 which has been proposed for creep-proofing of the outer ring of a bearing. This type comprises outer ring 10 having one or more (two in FIG. 2) grooves 12 of prescribed depth around the whole circumference thereof in each of which resin band 13 comprising a synthetic resin composition containing polyamide 11, polybutylene terephthalate, etc. as a main component is formed with its outer circumference 14 slightly projecting on outer circumference 11 of the outer ring. The resin-banded bearing takes advantage of the higher thermal expansion coefficient of synthetic resin materials than that of metals. For example, in the case of using a light-alloy (e.g., aluminum alloy) housing and bearing steel, even if the fit becomes loosened in high temperatures due to a difference in thermal expansion coefficient between the housing and the bearing, the resin band around the bearing expands to maintain the tight fit over a broad temperature range thereby preventing creep.

The first type in which slippage of axis 1 and inner ring 3 can be stopped by chocking up steel ball 5 by means of metallic cramp ring 7 is liable to damage axis 1 and to undergo loosening on vibration, failing to exert sufficient creep-proofness.

The resin-banded type, on the other hand, accomplishes creep prevention by making use of compressive resistance of the resin band exerted o the housing and thus causes no damage of the housing and is strong at vibration. However, when it is used at temperatures above a certain level for a long time, the resin material is deteriorated with time, resulting in reduction of creep-proof effects. More specifically, conventional synthetic resin bands are made from resin compositions containing polyamide 11 (hereinafter abbreviated as PA11), polybutylene terephthalate (hereinafter abbreviated as PBT) as a main component. In particular, generally having a high thermal expansion coefficient in a middle temperature range, a PA11 composition has been proved to exhibit excellent creep-proofing performance within a temperature range of from $-30°$ to $120°$ C. With the recent pronounced tendencies to increases in temperature and speed in the bearing working environment, there has been an increasing demand for durability in a higher temperature environment, e.g., from $140°$ to $160°$ C. However, PA11 has a low melting point and, when used at high temperatures exceeding $150°$ C. for a long period of time, undergoes progressive deterioration with time, such as reductions in dimensions and mechanical strength, thus failing to retain the satisfactory creep-proofing performance during long-term use.

After the continuous study on resin compositions suitable for use in resin-banded type bearings, the inventors previously proposed to use polyamide 66 (hereinafter abbreviated as PA66) having a higher melting point and higher thermal aging resistance than PA11 and developed a resin composition capable of providing resin bands withstanding long-term and continuous use in high temperatures of $150°$ C. or more, which comprises from 50 to 95% by weight of a polyphenylene sulfide resin, from 0 to 35% by weight of a polyamide resin, and from 5 to 15% by weight of a filler, as disclosed in Japanese Patent Application No. Hei-2-90958 (which corresponds to JP-A-287662).

While the newly developed resin composition uses a resin having high rigidity and a large thermal expansion coefficient, PA66 has high water absorbing properties and increases the outer diameter of the band on water absorption or, in turn, contracts on dehydration, thus leaving a difficulty in dimensional maintenance.

SUMMARY OF THE INVENTION

An object of the present invention is to eliminate the above-mentioned problems associated with the conventional techniques and to provide a resin composition which withstands long-term and continuous use in high temperatures of from $140°$ to $160°$ C. or even higher to stably exhibit creep-proofing performance in resin-banded bearings.

The resin composition according to the present invention comprises from 25 to 65% by weight of a thermoplastic polyester elastomer, from 70 to 20% by weight of a thermoplastic polyester resin, and from 5 to 15% by weight of a filler, based on the total amount of the thermoplastic polyester elastomer, the thermoplastic polyester resin and the filler.

DETAILED DESCRIPTION OF THE INVENTION

Figure 1:
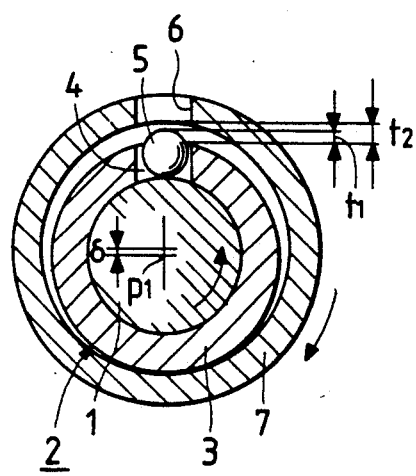
FIG. 1 is a cross section of a conventional creep-proof bearing.
Figure 2:
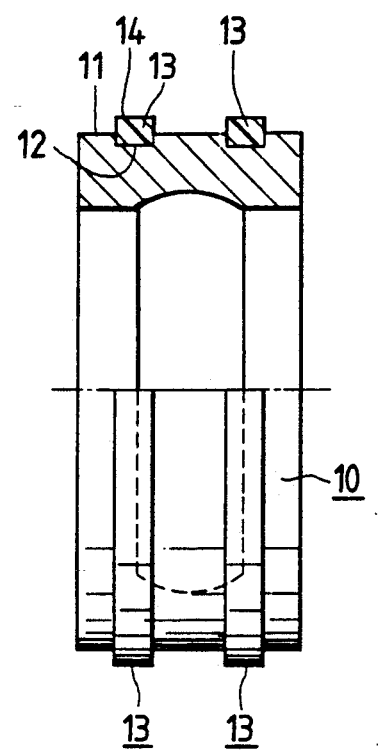
FIG. 2 is a partial cross section of a conventional resin-banded creep-proof bearing.

Examples of the thermoplastic polyester elastomer (hereinafter TPE) used in the present invention include a polyester-polyester type thermoplastic polyester elastomer and a polyester-polyether type thermoplastic polyester elastomer. The polyester-polyester type thermoplastic polyester elastomer is preferred since it has more excellent in heat-resistance and heat-deterioration and is available as a commercial product, e.g., "Pelprene S Type" produced by Toyobo Co., Ltd. and "Arnitel" produced by AKZO N.V. Co., Ltd.

Examples of the polyester-polyester type TPE include a compound represented by formula (I):

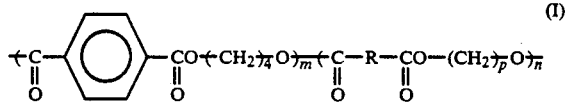

wherein R represents an aliphatic hydrocarbon and m, n, and p are selected such that the compound has a melt index (according to ASTM-D-1238) of 10 to 20 g/10 minutes at 230° C. The polyester-polyester type TPE of formula (I) is available as a commercial product, e.g., "Perplene S Type" produced by Toyobo Co., Ltd.

The TPE is used in the range of from 25 to 65% by weight, preferably from 30 to 45 by weight. If the amount of TPE is less than 25 wt%, characteristics of linear expansion coefficient, elongation at high temperature, flexibility which decreases the pressure on fitting, and heat-deterioration are not improved sufficiently. Therefore, the preferred amount of TPE is from 30% or more to attain the improvement in these characteristics certainly. On the other hand, the upper limit is 65 wt% since the thermal rigidity in high temperatures becomes poor if it exceeds 65 wt%. Furthermore, if it exceeds 45 wt%, these characteristics are not improved dramatically and high cost is brought about. Therefore, the upper limit is preferably 45 wt% or less.

The thermoplastic polyester resin used in the present invention include PBT and PET (polyethylene terephthalate), which can be selected from commercially available resins. PBT is preferably used. Use of the thermoplastic polyester resin aims at endowing the resin composition with thermal rigidity to thereby improve molding flow of the composition. The thermoplastic polyester resin having a melt index of from 1 to 20 g/10 minutes at 230° C. is preferred.

If the amount of the thermoplastic polyester resin is less than 20 wt%, the improvement in thermal rigidity is not sufficient for achieving satisfactory creep-proofing. If it exceeds about 70% by weight, the composition does not have sufficient thermal expansion coefficient, sometimes failing to achieve satisfactory creep-proofing in a temperature range of from room temperature to the middle temperature (about 100° C.). A preferred amount of PBT is from about 30 to about 60 wt% by weight.

When the amount of the thermoplastic polyester resin is smaller than that of the TPE, the composition tends to have poor thermal rigidity in high temperatures (about 160° C. or more) even if it contains a filler. Therefore, the amount of the thermoplastic polyester resin is preferably equal to o larger than that of the TPE.

The filler is used in an amount of from 5 to 15 wt%, preferably from 7 to 10 wt%. The filler serves to improve compressive strength and thermal rigidity of the resin composition in high temperatures.

The filler is effective for endowing the composition with high thermal rigidity in high temperatures. For this purpose, the amount of the filler is required to fall within the range of 5 wt% or more. On the other hand, if the amount of the filler exceeds 15 wt%, the composition has poor linear expansion coefficient and poor moldability, and the resin band molded with the composition has a weak strength in the weld portion.

Examples of usable fillers include particles of amorphous carbon, carbon black, graphite, silica, alumina, silicon carbide and silicon nitride; fibers or whiskers of glass, potassium titanate, silicon carbide and carbon; metallic fibers of aluminum, copper, iron; and aromatic polyamide fibers (aramid fiber), fluorine-containing resin fibers, and silicone resin powders.

When the filler is in the form of particles, the particle diameter is preferably in the range of from 10 to 30 μm. When the filler is in the form of fibers, the fiber preferably has a diameter of from 10 to 15 μm and a length of from 10 to 300 μm for preventing the decrease of strength on the weld portion of a molded ring.

For the purpose of improving fabrication stability, surface properties or toughness, coloring, or static charge prevention, the resin composition of the present invention may furthermore contain adequate amounts of various additives, such as stabilizers, fluidity-improving agents, surface modifiers, colorants, antistatic agents, and various other resins, as far as the effects of the present invention are not considerably impaired.

For the preparation of the resin composition of the present invention, the means for compounding the above-described components is not particularly limited. Each component may be separately fed to a melt-mixing machine, or may be pre-mixed in a mixer, e.g., a Henschel mixer and a ribbon blender, and then fed to a melt-mixing machine. Suitable melt-mixing machines include a single- or twin-screw extruder, a mixing roll, a pressure kneader, and Brabender Plastograph.

The resin composition of the present invention can be applied for various resin-banded bearings (e.g., a rolling bearing and slip bearing). At least one resin band (which responds to a groove) can be provided on the outer circumference of an outer ring or the inner circumference of an inner ring and may be parallel or slant to the axis direction or the circumference direction.

The present invention is now illustrated in greater detail with reference to Examples, but it should be understood that the present invention is not deemed to be limited thereto. All the percents are by weight unless otherwise indicated.

EXAMPLES 1 TO 5 AND COMPARATIVE EXAMPLES 1 TO 5

Polyester type TPE resin compositions were prepared as follows according to the formulation shown in Table 1 below.

TABLE 1

| Example No. | Polyester Type TPE[1] (%) | PBT[2] (%) | PA11[3] (%) | Graphite[4] (%) | Spherical Amorphous Carbon[5] (%) | Spherical Silica[6] (%) | Glass Fiber (%) |
| --- | --- | --- | --- | --- | --- | --- | --- |
| Example 1 | 65 | 20 |  | 15 |  |  |  |
| Example 2 | 61.6 | 26.4 |  | 12 |  |  |  |
| Example 3 | 61.6 | 26.4 |  |  | 12 |  |  |
| Example 4 | 61.6 | 26.4 |  |  |  | 12 |  |
| Example 5 | 28 | 67 |  | 5 |  |  |  |
| Comparative Example 1 |  |  | 90 | 10 |  |  |  |
| Comparative Example 2 |  | 92.5 |  |  |  |  | 7.5 |
| Comparative Example 3 | 15 | 80 |  | 5 |  |  |  |
| Comparative Example 4 | 70 | 20 |  | 10 |  |  |  |
| Comparative Example 5 | 60 | 20 |  | 20 |  |  |  |

Note:
[1] "Pelprene S-2002" produced by Toyobo Co., Ltd.
[2] "Valox 357" in Examples and "Valox 457" in Comparative Examples, both produced by G.E. Plastics Japan Co., Ltd.
[3] "Rilsan BESN G9 TL" produced by Toray-Du Pont.
[4] "CLX " produced by Chuetsu Kokuen Kogyo K.K.
[5] "Bellpearl" C-800" produced by Kanebo Ltd.
[6] "HARMIC SCO" produced by Micron K.K.

Prescribed amounts of the above components were pre-mixed in a Henschel mixer "FM-10B" manufactured by Mitsui Miike Machinery Co., Ltd. and then melt extruded in a twin-screw extruder "MODEL PCM-30" manufactured by Ikegai Iron Works, Ltd. to obtain pellets.

A bearing having two grooves (depth: 0.8 mm) on its circumference was prepared, and the pellets were melted and injected into each of the grooves by means of an injection molding machine "MODEL SIM 474 9/80" manufactured by Technoplas K.K. to produce a resin-banded bearing having two resin bands therearound with the outer surface of each resin band projecting on the circumference of the outer ring to a height of 5 to 10 μm.

Figure 3:
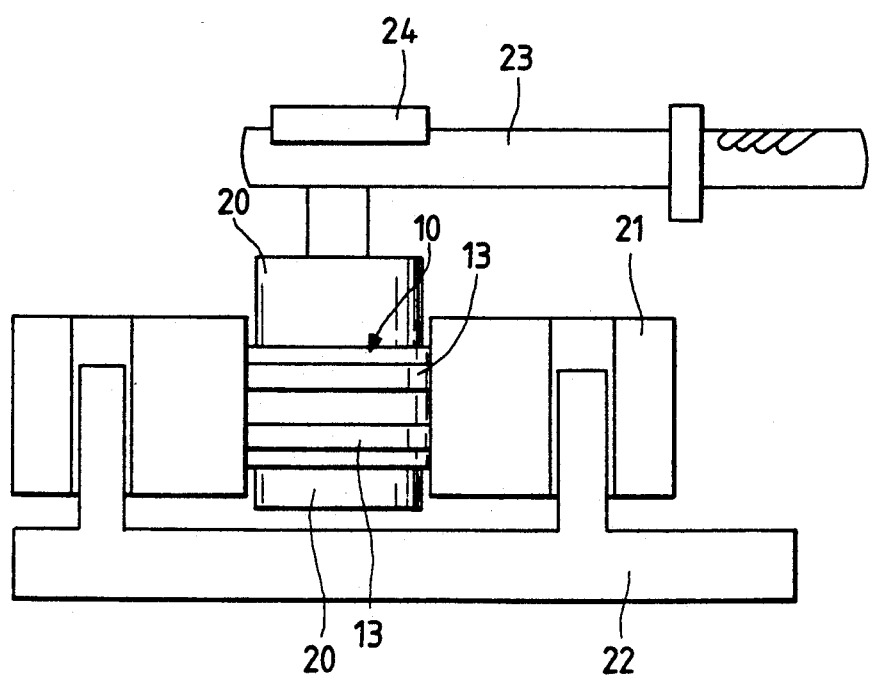
FIG. 3 schematically illustrates a test method for evaluating creep-proofing performance of sample bearings.

Creep-proofing performance of the thus obtained resin-banded bearing was evaluated as follows by use of testing equipment shown in FIG. 3. Bearing outer ring 10 having resin band 13 therearound was fitted into aluminum-made housing 21 at an interference of about 5 to 10 μm with respect to the outer diameter of outer ring 10 using fixing holder 20. Housing 21 was fixed on mount 22 and allowed to stand at a temperature varying from room temperature up to 190° C. for 1 hour. Torque wrench 23 was attached to outer ring 10, and the rotational torque was read out after 1 cycle at 1 to 2 rpm. with torque display meter 24. The results obtained are shown in Table 2 below.

TABLE 2

| Example No. | Rotational torque (kgf-cm) | | | | | |
| --- | --- | --- | --- | --- | --- | --- |
|  | Room Temp. | 50° C. | 100° C. | 140° C. | 170° C. | 190° C. |
| Example 1 | 48 | 45 | 70 | 75 | 60 | 50 |
| Example 2 | 65 | 59 | 68 | 103 | 75 | 65 |
| Example 3 | 75 | 48 | 50 | 75 | 65 | 60 |
| Example 4 | 110 | 70 | 55 | 75 | 60 | 50 |
| Example 5 | 85 | 72 | 50 | 60 | 80 | 95 |
| Comparative Example 1 | 85 | 60 | 42 | 55 | 75 | melted |
| Comparative Example 2 | 95 | 58 | 30 | 50 | 70 | 80 |
| Comparative Example 3 | 60 | 40 | 38 | 35 | 45 | 77 |
| Comparative Example 4 | 70 | 35 | 35 | 25 | 20 | 10 |
| Comparative Example 5 | 60 | 45 | 50 | 40 | 30 | 30 |

It is seen that the comparative resin-banded bearing using PA11 (Comparative Example 1) or PBT (Comparative Example 2) as a resinous component (before thermal deterioration) exhibits a low rotational torque in a quasi-high temperature range (130° to 160° C.) chiefly aimed at in the present invention and drastically rises in a further elevated temperature range. That is, the torque of the PBT composition and the PA11 composition at 170° C. was about 70 kgf-cm and about 75 kgf-cm, respectively. To the contrary, the bearing using the resin composition of the present invention showed a high rotational torque of about 100 kgf-cm at 140° C., which temperature is close to that of a bearing while the axis is stationarily rotating at a high speed. Although the rotational torque tended to decrease at about 170° C. or higher but still retained the level of 75 kgf-cm which is equal to that of the PA11 composition. Considering a temperature range in which the rotational torque of the bearing is smallest, the PA11 composition or PBT composition had its smallest rotational torque at around 100° C., whereas the resin composition of the present invention had its smallest rotational torque at around 50° C. The smallest rotational torque of the resin composition of the invention was 45 kgf-cm, which was still higher than that of the PA11 or PBT composition. It is thus proved that use of the resin composition according to the present invention exhibits excellent creep-proofing performance in the above-described quasi-high temperature range, i.e., the temperature of a bearing with an axis stationarily rotating at a high speed.

The rotational torque as measured under the above-described testing conditions is preferably 30 kgf-cm or more from the point of view of sufficient creep-proof performance.

The rotational torque of the bearing of Comparative Example 1 at 190° C. could not be measured because the PA11 composition used, having a melting point of about 185° C., melted at 190° C. and the bearing fell off the housing.

The resin compositions used in Examples 3 and 4 have the same composition as the resin composition used in Example 2, except that the graphite is replaced with spherical amorphous carbon particles and spherical silica, respectively. These resin compositions showed the same temperature-dependent rotational torque behavior as that of the composition of Example 2, having satisfactory rotational torque values measured in the whole measuring temperature range.

On comparing Example 5 with Comparative Example 3, the rotational torque of the bearing using a resin composition having a high PBT content (Comparative Example 3) was not more than 40 kgf-cm in a temperature range of from 50° to 140° C. and drastically rose at temperatures exceeding 170° C., whereas the bearing using the resin composition having a lower PBT content (Example 5) showed its minimum rotational torque, 50 kgf-cm, at 100° C., and, after the temperature exceeded 100° C., increased its rotational torque with a temperature rise.

On comparing Example 1 and Comparative Examples 4 and 5, which are equal in PBT content and different in polyester TPE/graphite compounding ratio, the bearings of Comparative Example 4 (polyester TPE content: 70%) and Comparative Example 5 (graphite content: 20%) did not show an increase of rotational torque with a temperature rise and held a certain upper level, whereas the rotational torque of the bearing of Example 1 decreased to the minimum, 45 kgf-cm, at around 50° C. and reached the maximum, 75 kgf-cm, at around 140° C. Further comparing with Comparative Examples 1 and 2, it can be seen that the resin composition as long as falling within the scope of the present invention shows a rotational torque value higher than those of conventional PA11 composition and PBT composition in a quasi-high temperature range of from 100 to 150° C.

The above-mentioned rotational torque behavior of the resin composition according to the present invention is manifested as a result of mutual actions of thermal expansion coefficient and thermal rigidity of the resinous components and the effects of the filler in enhancing mechanical strength and in reducing thermal expansion coefficient. It has now been revealed that the resin composition according to the present invention which makes the best use of such functions of constituting components manifests extremely excellent creep-proofing performance in a broad temperature range.

EXAMPLES 6 TO 9 AND COMPARATIVE EXAMPLES 6 TO 9

A resin-banded bearing was produced in the same manner as in Example 1, except for using a resin composition shown in Table 3 below. The raw materials used here are the same as those described in the footnote of Table 1. Duration of the creep-proofing performance of the resin-banded bearing was determined as follows.

The bearing was fitted into the same aluminum housing as used in Example 1 and allowed to stand in a hot air-circulating thermostat set at 170° C. for a prescribed time up to 500 hours. Then, each sample was allowed to stand at 100° C., 140° C., or 170° C. for 1 hour, and the rotational torque at that temperature was measured in the same manner as in Example 1. The results obtained are shown in Table 4.

TABLE 3

| Example No. | Polyester Type TPE (%) | PBT (%) | PA11 (%) | Graphite (%) | Spherical Amorphous Carbon (%) | Spherical Silica (%) | Glass Fiber (%) |
| --- | --- | --- | --- | --- | --- | --- | --- |
| Example 6 | 55 | 35 | | 10 | | | |
| Example 7 | 61.6 | 26.4 | | | 12 | | |
| Example 8 | 61.6 | 26.4 | | | | | |
| Example 9 | 28 | 67 | | 5 | | | |
| Comparative Example 6 | | | 90 | 10 | | | |
| Comparative Example 7 | | 92.5 | | | | | 7.5 |
| Comparative Example 8 | 15 | 80 | | 5 | | | |
| Comparative Example 9 | 70 | 20 | | 10 | | | |

TABLE 4

| | Rotational torque (kgf-cm) | | | | | | | | |
| --- | --- | --- | --- | --- | --- | --- | --- | --- | --- |
| Example No. | 0-Hour Standing | | | 250-Hour Standing | | | 500-Hour Standing | | |
| | 100° C. | 140° C. | 170° C. | 100° C. | 140° C. | 170° C. | 100° C. | 140° C. | 170° C. |
| Example 6 | 60 | 95 | 80 | 58 | 109 | 75 | 45 | 85 | 58 |
| Example 7 | 50 | 75 | 63 | 40 | 94 | 75 | 35 | 65 | 55 |
| Example 8 | 55 | 75 | 57 | 55 | 68 | 55 | 35 | 55 | 40 |
| Example 9 | 45 | 60 | 80 | 40 | 45 | 78 | 30 | 35 | 65 |
| Comparative Example 6 | 45 | 55 | 75 | 20 | 25 | 45 | 12 | 15 | 33 |
| Comparative Example 7 | 30 | 50 | 70 | 20 | 25 | 61 | 10 | 20 | 58 |
| Comparative Example 8 | 38 | 35 | 45 | 30 | 30 | 55 | 15 | 25 | 65 |

On comparing Example 6 with Comparative Examples 6 and 7, the bearing using the PA11 composition (Comparative Example 6) or the PBT composition (Comparative Example 7) suffered from a considerable reduction of rotational torque when allowed to stand at 170° C. That is, after 250-hour standing, the rotational torque measured at 100 to 140° C. decreased to a low level insufficient as a creep-proof bearing and, after 500-hour standing, some of the bearings fell off the housing. To the contrary, the bearing using the resin composition of the present invention stably retained a torque value above 45 kgf-cm over the whole testing time in a temperature range of from 100° to 170° C. in which a creep phenomenon is likely to occur.

The resin compositions used in Examples 7 and 8 are the same as the resin composition of Example 6 except for using spherical amorphous carbon particles and spherical silica, respectively, as a filler in place of graphite. It is seen that these compositions similarly retained a rotational torque value of 30 kgf-cm or more, a level required for creep prevention, over the whole testing time.

On comparing Examples 6 and 9 and Comparative Example 8, the resin composition mainly comprising polyester type TPE (Example 6) showed its maximum rotational torque at around 140° C. and, even after standing at 170° C. for 500 hours, still retained the necessary rotational torque level. On the other hand, the resin composition of Example 9 which satisfies the compounding condition of the present invention while containing PBT as a major resin component gave satisfactory rotational torque values in the whole range of measuring conditions. Whereas, the resin composition of Comparative Example 8 whose compounding ratio is out of the scope of the present invention, when allowed to stand at 170° C. for 500 hours, suffered from a serious reduction of rotational torque value at 140° C. or lower to such a low level incapable of withstanding use.

As described and demonstrated above, a resin-banded bearing using the resin composition comprising from 25 to 65% by weight of a polyester type TPE, from 20 to 70% by weight of PBT, and from 5 to 15% by weight of a filler exhibits high creep-proofing performance over a wide temperature range, and the bearing retains the high creep-proofing performance for a prolonged period of time even on use at high temperatures. It is apparent that the resin-banded bearing according to the present invention sufficiently withstands long-term use under a high temperature environmental condition.

The present invention thus provides a resin composition comprising from 25 to 65% by weight of a polyester type TPE which is excellent in heat resistance and soft and has a high linear expansion coefficient, from 20 to 70% by wight of a thermoplastic polyester resin having moderate thermal rigidity as resinous components, and from 5 to 15% by weight of a filler having excellent dispersibility as a reinforcing component, in which each component exerts its function to the full, to thereby provide a resin-banded bearing exhibiting stable creep-proofing performance over a broad temperature range for an extended period of time.

While the invention has been described in detail and with reference to specific examples thereof, it will be apparent to one skilled in the art that various changes and modifications can be made therein without departing from the spirit and scope thereof.

What is claimed is:

1. A resin composition for a resin-banded bearing consisting essentially of (a) from 25 to 65% by weight of an aromatic polyester-aliphatic polyester type thermoplastic polyester elastomer resin polymerized by block copolymerization of polymeric 1,4-butylene terephthalate derived from aromatic dicarboxylic acids and butylene glycols having the general formula (i):

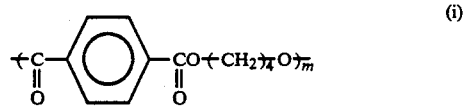

and aliphatic polyester derived from non-cyclic aliphatic dicarboxylic acids and non-cyclic aliphatic diols having the general formula (ii):

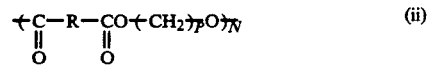

wherein R is a non-cyclic aliphatic hydrocarbon and m, n, p and R are selected such that the aromatic polyester-aliphatic polyester type thermoplastic polyester elastomer resin has a melt index according to ASTM-D-1238 of 10 to 20 g/10minutes at 230° C., (b) from 70 to 20% by weight of a thermoplastic aromatic polyester resin, and (c) from 5 to 15% by weight of a filler, based on the total amount of the aromatic polyester-aliphatic polyester type thermoplastic polyester elastomer resin, the thermoplastic aromatic polyester resin and the filler.

2. A resin composition as in claim 1, wherein said thermoplastic polyester resin is polybutylene terephthalate.

3. A resin composition as in claim 1, wherein said filler is selected from the group consisting of a particle of amorphous carbon, carbon black, graphite, silica, alumina, silicon carbide and silicon nitride, a fiber or a whisker of glass, potassium titanate, silicon carbide, carbon, aluminum, copper, iron, aromatic polyamide and fluorine-containing resin, and a silicone resin powder.

4. A bearing comprising at least the outer circumference of an outer ring which is fitted into a housing and the inner circumference of an inner ring which is fitted onto an axis, wherein at least one groove is provided on at least one of the outer circumference and the inner circumference and said at least one groove is molded with a resin composition consisting essentially of (a) from 25 to 65% by weight of an aromatic polyester-aliphatic polyester type thermoplastic polyester elastomer resin polymerized by block copolymerization of polymeric 1,4-butylene terephthalate derived from aromatic dicarboxylic acids and butylene glycols having the general formula (i):

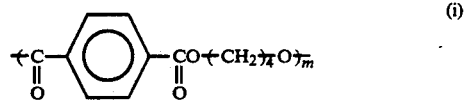

and aliphatic polyester derived from non-cyclic aliphatic dicarboxylic acids and non-cyclic aliphatic diols having the general formula (ii):

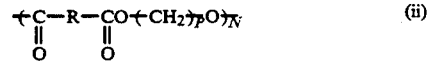

wherein R is a non-cyclic aliphatic hydrocarbon and m, n, p and R are selected such that the aromatic polyester-aliphatic polyester type thermoplastic elastomer resin has a melt index according to ASTM-D-1238 of 10 to 20 g/10minutes at 230° C., (b) from 70 to 20% by weight of a thermoplastic aromatic polyester resin, and (c) from 5 to 15% by weight of a filler, based on the total amount of the aromatic polyester-aliphatic polyester type thermoplastic polyester elastomer resin, the thermoplastic aromatic polyester resin and the filler.

5. A bearing as in claim 4, wherein said thermoplastic polyester resin is polybutylene terephthalate.

6. A bearing as in claim 4, wherein said filler is selected from the group consisting of a particle of amorphous carbon, carbon black, graphite, silica, alumina, silicon carbide and silicon nitride, a fiber or a whisker of glass, potassium titanate, silicon carbide, carbon, aluminum, copper, iron, aromatic polyamide and fluorine-containing resin, and a silicone resin powder.

* * * * *